United States Patent [19]
Takimoto et al.

[11] Patent Number: 5,300,532
[45] Date of Patent: Apr. 5, 1994

[54] INTEGRAL SKIN-FOAM MOLDED ARTICLE

[75] Inventors: Masahiro Takimoto; Hisashi Mizuno; Junichi Hirano, all of Aichi, Japan

[73] Assignee: Toyoda Gosei Co., Ltd., Nishikasugai, Japan

[21] Appl. No.: 60,505

[22] Filed: May 12, 1993

Related U.S. Application Data

[63] Continuation of Ser. No. 870,892, Apr. 20, 1992, abandoned.

[30] Foreign Application Priority Data

Apr. 25, 1991 [JP] Japan .................. 3-095093

[51] Int. Cl.$^5$ .................. C08J 9/34
[52] U.S. Cl. .................. 521/51; 264/45.5; 521/126; 521/127; 521/129
[58] Field of Search .................. 521/51, 126, 127, 129; 264/45.5

[56] References Cited

U.S. PATENT DOCUMENTS

| | | | |
|---|---|---|---|
| 4,379,105 | 4/1983 | Taylor et al. | 521/914 |
| 4,444,704 | 4/1984 | Hira et al. | 521/51 |
| 4,499,038 | 2/1985 | Schaefer et al. | 521/51 |
| 4,789,688 | 12/1988 | Dewhurst et al. | 521/128 |

*Primary Examiner*—Morton Foelak
*Attorney, Agent, or Firm*—Cushman, Darby & Cushman

[57] ABSTRACT

The present invention relates to integral skin-foam molded articles obtained by reaction-injection molding a polyurethane foam material comprising a polyol component, an isocyanate component, a catalyst, and a blowing agent. Catalysts may be selected from tin and amine compounds. Water has been successfully used as a blowing agent.

5 Claims, 1 Drawing Sheet

INTEGRAL SKIN-FOAM MOLDED ARTICLE

This is a continuation of application Ser. No. 870,892, filed on Apr. 20, 1992 abandoned.

FIELD OF THE INVENTION

The present invention relates to an integral skin-foam (ISF) molded article obtained by reaction-injection molding a polyurethane (PUR) foam material comprising a polyol component, an isocyanate component, a catalyst, and a blowing agent as essential ingredients. The present invention is particularly useful for making ISF molded articles, such as interior automotive trim pieces, e.g., urethane steering wheels, horn pads, arm rests, head rests, instrument panels, and the like, in which design, abrasion resistance and softness are desireable.

BACKGROUND OF THE INVENTION

Fluorocarbon-type blowing agents which enable the easy formation of integral skin (IS) layers, especially chlorofluorocarbons (CFCs) represented by trichlorofluoromethane (Freon-11), are frequently employed as the blowing agents in conventional urethane foam molding materials for producing urethane steering wheels (ISF molded articles) because CFCs meet the requirements for blowing agents enabling easy formation of IS layers (i.e., having moderate boiling points ($-40°$ to $70°$ C.) and being easily liquified by slight pressurizing) and are free from the fear of fire or explosion, non-toxic, and inexpensive. However, since fluorocarbons, particularly CFCs, are thought to be a cause of the destruction of the ozone layer, there is an international trend toward control of the use of these components. Hydrofluorocarbons (HCFCs), for this reason, are attracting attention because it is thought they are less apt to destroy the ozone layer. However, substitution of HCFCs is not the ultimate solution because the compounds are not thought to completely eliminate the fear of ozone layer destruction.

On the other hand, molded articles produced from PUR foam materials of so-called water-blown formulations in which water is employed as the blowing agent have been marketed. However, the water-blown formulations have conventionally been thought to be unsuited for the production of ISF molded articles because it has been difficult to form a uniform IS layer using such formulation. Illustratively stated, the water-blown formulation practiced by one skilled in the art, foaming is based on carbon dioxide gas generated by the reaction of an isocyanate with water and this carbon dioxide gas is less apt to liquify at ordinary mold temperatures. Even with pressurization, the carbon dioxide gas generated in the foaming system, in a mold, does not liquify nor does it liquify on the outer part of the mold, where temperatures are lower. As a result, an IS layer is hardly formed.

SUMMARY OF THE INVENTION

An object of the present invention is to provide an ISF molded article obtained by reaction-injection molding a PUR foam material of water-blown formulation, and having a uniform IS layer.

The present invention is accomplished with an ISF molded article obtained by reaction-injection molding a PUR foam material comprising a polyol component, an isocyanate component, a catalyst, and a blowing agent, wherein the catalyst comprises a tin compound catalyst incorporated in the foam material in an amount of from 0.1 to 1.5 parts by weight per 100 parts by weight of the polyol component; the blowing great comprises water incorporated in the foam material in an amount of from 0.1 to 1.2 parts by weight per 100 parts by weight of the polyol component.

In another embodiment, the present invention may further comprise a mixture of tin and amine catalyst, the amine catalyst having at least one blocked nitrogen. The blocked amine catalyst is incorporated in the PUR foam material in an amount of from 0.1 to 1.5 parts by weight, preferably from 0.2 to 1.0 part by weight, per 100 parts by weight of the polyol component.

All ingredients in the present disclosure are given by weight unless otherwise indicated.

BRIEF DESCRIPTION OF THE DRAWINGS

In the accompanying drawings, the specific components are described in fuller detail by way of the detailed description of the invention.

DETAILED DESCRIPTION OF THE INVENTION

Figure 1:
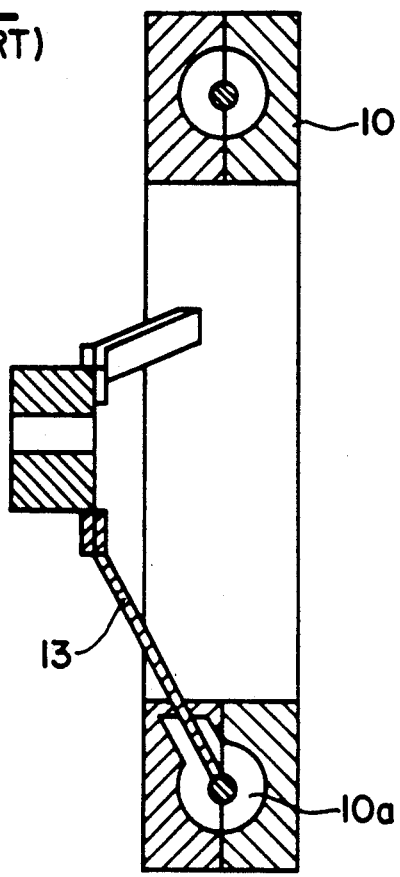
FIG. 1 (PRIOR ART) is a diagrammatic sectional view of a mold used for molding a urethane steering wheel as one example of the ISF molded article of the present invention.

The present invention is explained below in detail with respect to each of the ingredients of the PUR foam material and to the molding method therefor.

The present invention relates to an ISF molded article obtained by the reaction-injection molding of a PUR foam material comprising a polyol component, an isocyanate component, a catalyst, and a blowing agent.

The polyol component, preferably employs polyether polyols in the case of molding a urethane steering wheel (because rigidity regulation is easy). Specifically, a suitable combination of polyether polyols selected from various bifunctional and trifunctional polyether polyols and, if needed, also from various quadri-functional polyether polyols may generally be employed. Examples of such polyols are as follows.

(i) Bifunctional Polyether Polyols: Polyoxypropylene-polyoxyethylene glycol, Polyoxyethylene glycol (PEG), Polyoxypropylene glycol (PPG), Polyoxybutylene glycol.

(ii) Trifunctional Polyether Polyols: Propylene oxide-trimethylolpropane copolymers, Propylene oxide-hexanetriol copolymer, Propylene oxide-glycerin copolymers, Ethylene oxide-propylene oxide-glycerin copolymers.

(iii) Quadrifunctional Polyether Polyols: Ethylenediamine-ethylene oxide-propylene oxide copolymers.

It is desirable that the ratio of the blended amount of the bifunctional polyether polyol(s) to that of polyether polyol(s) having at least trifunctional group (e.g., trifunctional group and/or quadrifunctional group) be preferably from 75/25 to 0/100 (more preferably from 75/25 to 25/75). If the blended amount of polyether polyols having at least trifunctional group (e.g., trifunctional group and/or quadrifunctional group) is too large, the resulting molding material shows unstable flowability during molding and air inclusion is apt to occur, because tri-and/or quadrifunctional polyetherpolyols are more reactive than bifunctional polyether polyols.

For urethane steering wheels in particular, it is also desirable that the polyol component be a combination of polyether polyols and chain extender such as those described below. The chain extender functions to enhance the strength and impact resilience of molded articles to be produced from the present invention, and also functions as a heat controller in the reaction system.

(i) Polyether Polyols: Hydroxyl number, 20-55; average functionality, 2-3; PPG/PEG=70/30 to 95/5; percentage of primary hydroxyl groups in terminal hydroxyl groups, 50-95%.

(ii) Chain Extender: Examples include ethylene glycol (EG); diethylene glycol (DEG); 1,4- butanediol, and the like. The amount of the chain extender to be incorporated in the PUR foam material may, for example, is preferably from 2 to 15 parts (more preferably from 3 to 10 parts) for EG and preferably from 3 to 25 parts (more preferably from 5 to 15 parts) for either DEG or 1,4-butanediol, per 100 parts of the polyether polyols described above. If the chain extender is used in an excess amount, molded articles to be obtained from the PUR foam material are too rigid and are prone to have an incomplete IS layer because the PUR foam material reacts at an accelerated rate, yielding impaired flowability during molding.

The isocyanate component of the present invention may be one that is ordinarily employed by one skilled in the art. For example, any one selected from the following examples and used in a suitable amount, according to the properties required of molded articles to be produced. In the case where the molded article to be produced is required to have a finish coating or, when in-mold coating is not applied to the molded article, use of an aliphatic isocyanate, which is of a non-yellowing type, is desirable.

Examples of aromatic isocyanates useful in the present invention include 4,4'-diphenylmethane diisocyanate (MDI), polymeric MDI (crude MDI), liquid MDI, tolylene diisocyanate, phenylene diisocyanate, and the like. Further, dimers, trimers, prepolymers, and the like obtained by polymerizing any of these monomeric diisocyanates are also applicable from the standpoint of isocyanate handling an the properties of molded articles according to the present invention.

Besides truly aliphatic isocyanates, alicyclic isocyanates are also applicable. Examples thereof include hexamethylene diisocyanate (HMDI), xylene diisocyanate (XDI), hydrogenated xylene diisocyanate (hydrogenated XDI), 4,4'-methylenebisdicyclohexyl diisocyanate (H12MDI), methylcyclohexyl diisocyanate (hydrogenated TDI), isophorone diisocyanate (IPDI), and the like. Further, so-called non-yellowing dimers, trimers, prepolymers, and the like obtained by polymerizing any of these monomeric diisocyanates are also applicable from the standpoint of isocyanate handling and the properties of molded articles according to the present invention.

Specifically, for urethane steering wheels, it is desirable that the isocyanate component be an MDI-type isocyanate as specified below and be used in such an amount as to result in an NCO/OH ratio of from 0.93 to 1.3.

MDI-type isocyanates may also be useful. A blend of a prepolymer of pure MDI and a polymeric MDI in a former/latter ratio of from 25/75 to 100/0; it is preferred that a NCO content is 20-35%.

The PUR foam material from which the ISF molded article of the present invention is to be produced, may contain a catalyst comprising a tin compound and a blowing agent which is water. One or more tin compounds selected from dibutyltin laurate, dibutyltin maleate, dioctyltin laurate, and dioctyltin acetate may be used in the present invention. The tin catalyst is incorporated in the PUR foam material in an amount of from 0.1 to 1.5 parts by weight, preferably from 0.2 to 1.0 part by weight, per 100 parts by weight of the polyol component.

If the amount of the tin compound catalyst is less than 0.1 parts by weight, sufficient catalysis of the urethane-forming reaction (polymerization reaction) and carbon dioxide gas-generating reaction (foaming reaction) is not brought about, so that the molding process necessitates an extended molding cycle and is hence impractical. On the other hand, if the amount of the tin compound catalyst exceeds 1.5 parts by weight, the urethane-forming reaction proceeds so rapidly that the resulting PUR foam material has poor flowability and, as a result, short shots (insufficient filling) are apt to occur. The ISF molded articles produced thereby do not have constant properties.

The amount of the water incorporated in the PUR foam material is from 0.1 to 1.2 parts by weight, preferably from 0.3 to 1.0 part by weight, per 100 parts by weight of the polyol component. If the incorporated amount of the water is less than 0.1 part, carbon dioxide gas is generated in an insufficient amount and, hence, it is difficult to form a core foam. If the amount thereof exceeds 1.2 parts by weight, carbon dioxide gas is generated in too large an amount (especially at the initial stage of the molding), so that not only is it difficult to obtain a uniform IS layer, but any carbon dioxide gas generated is apt to collect and, as a result, the molded articles thus obtained are prone to have surface defects, such as blistering, in the IS layer.

Accordingly, it is desirable that the catalyst employed in the PUR foam material further comprise an amine catalyst having at least one blocked amine nitrogen, besides the tin compound catalyst described above. The combined use of the tin compound catalyst and such an amine catalyst enables low-density ISF molded articles (or high-density ISF molded articles) to be produced more easily as compared with the case in which the tin compound catalyst is used alone.

The blocked amine catalyst is preferably incorporated in the PUR foam material in an amount of preferably from 0.1 to 1.5 parts by weight, more preferably from 0.2 to 1.0 part by weight, per 100 parts by weight of the polyol component. If the amount of the amine catalyst is less than 0.1, the carbon dioxide gas-generating reaction is not sufficiently catalyzed by the amine catalyst. If the amount thereof exceeds 1.5 parts, the carbon dioxide gas-generating reaction is accelerated excessively and, as a result, the resulting molded article is apt to have no IS layer or, possibly, develop a blister in the IS layer.

Examples of the amine catalyst include blocked amines obtained by blocking an amine nitrogen in any of the amine catalysts ordinarily used in water-blown type foaming materials known to one skilled in the art, such as; triethylenediamine (TEDA); triethanolamine, and others, with formic acid or the like. Although a TEDA-derived blocked amine in which the two amine nitrogens have been blocked may be used, use of a TEDA-derived blocked amine in which only one amine nitrogen has been blocked is preferred from the standpoint of rust prevention for the molds and molding machine.

Figure 2:
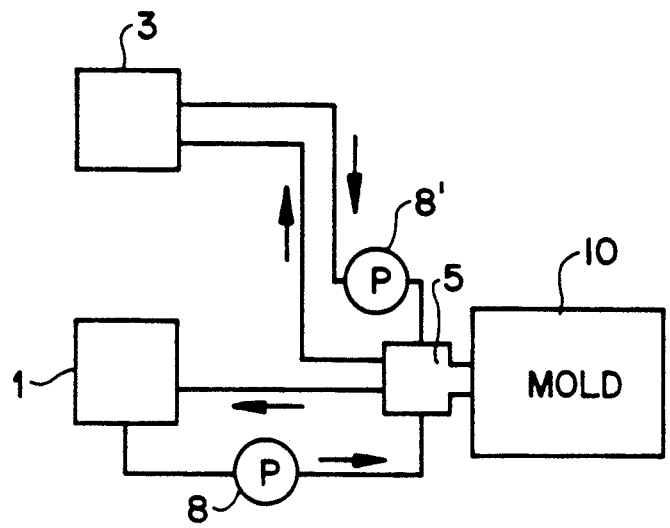
FIG. 2 (PRIOR ART) is a diagrammatic view illustrating a molding process for producing an ISF molded article of the present invention.

Using a PUR foam material satisfying the above-described requirements, an ISF molded article of the present invention is produced by reaction-injection molding (RIM). As one example of the molding method, RIM for producing a urethane steering wheel is explained below with reference to FIGS. 1 and 2.

The following advantages are realized by the formulations of the present invention. ISF molded articles having a uniform skin layer, as demonstrated by Examples that follow, can be produced, because the foam material of the present invention contains a tin compound catalyst unlike prior art foam materials of the water-blown type which have conventionally employed an amine catalyst only.

In the case where the tin compound catalyst is used in the foam material in combination with a blocked amine catalyst, the carbon dioxide gas-generating reaction in the foam material is accelerated without inhibiting the formation of an IS layer. The amine catalyst becomes active when the amine nitrogens are rendered free from blocking after the inside of the foam material has been heated by the urethane-forming reaction (exothermic reaction). For this reason, increased expansion heat is obtained and it becomes possible to easily produce low-density ISF molded articles having a uniform IS layer.

Thus, ISF molded articles having a uniform IS layer can be provided by means of water blowing, without using a fluorocarbon blowing agent which is thought to be a cause of ozone layer destruction.

The present invention will be further described with reference to the following non-limiting examples.

EXAMPLES

Prior to injection, a first liquid (comprising a blend of a polyol component with a chain extender, a catalyst, a blowing agent, etc.) and a second liquid (an isocyanate component) are held, circulating, in a first liquid tank 1 and a mixing head 5 and a second liquid tank 3 and the mixing head 5, respectively, by means of high-pressure metering pumps 8 and 8', while the two liquids are kept separate from each other. The first and second liquids are mixed, just before injection, by high-pressure impingement in the mixing chamber in the mixing head 5 by operating valves (not shown), and the mixture is then injected into a cavity 10a of a mold 10 in which a core metal 13 has been set.

The following molding conditions are presented as an example of the instant invention.
Temperature of PUR foam material (first and second liquids): 20°–60° C. (preferably 30°–40° C.),
Injection pressure: 100–200 kgf/cm2 (preferably 9.8–19.6 MPa),
Mold temperature: 20°–80° C. (preferably 40°–60° C.),
Injection rate: 100°300° g/sec,
Mold-closed time: 60–180 sec.

For each example presented below, a first liquid and a second liquid were prepared according to the following formulations, in which the kind and amount of each of the blowing agent and catalyst for the first liquid were changed as shown in Table 1. The two liquids were mixed by high-pressure impingement and the mixed material was then injected into the cavity 10a of the mold 10 shown in FIG. 1, thereby molding a urethane steering wheel.

Molding conditions were:
Injection pressure: 130 kgf/cm2 (12.7 Mpa);
Material temperature: 33+2° C.;
Mold temperature: 50° C.; and
Injection rate: 170 g/sec.

| PUR FOAM MATERIAL FORMULATIONS | |
|---|---|
| [First Liquid] | |
| Polyether polyol (functionality 2.5; PPG/PEG=80/20; hydroxyl value: 36) | 100 parts |
| Ethylene glycol | 5 parts |
| Catalyst | varying amount |
| Blowing agent | varying amount |
| Anti-aging agent (hindered amine type) | 3 parts |
| Pigment (brown) | 6 parts |
| [Second Liquid] | |
| MDI prepolymer (NCO content: 24%) | varying amount |
| [NCO/OH] | varying |

Each of the steering wheel obtained according to the above, was evaluated by property tests conducted with respect to the items shown below. The results obtained are summarized in Table 1.

TEST METHODS (i) Skin layer thickness: Measured with a slide gauge.
(ii) Tensile strength of skin layer:
Using Dumbbell No. 1 test pieces (according to JIS K6301), measurement was done with tester "Autograph DSC-10T A" (manufactured by Shimadzu Corporation, Japan) at a pulling rate of 200 mm/min.
(iii) Elongation at break of skin layer:
Measured under the same conditions as in the tensile strength test.
(iv) Hardness (Shore hardness) of skin layer:
Measured with A Shore durometer (according to ASTM D 2240).
(v) Density of skin layer:
Measured by the water displacement method (according to ASTM D 792).
(vi) Impact resilience of molded article:
Measured at 25° C. using a Lupke impact-resilience tester manufactured by Kobunshi Keiki Co.(according to JIS K-6301).

TABLE 1

| | Example 1 | Example 2 | Example 3 | Comparative Example (Prior Art) |
|---|---|---|---|---|
| [Catalyst] | | | | |
| DBTDL | 0.5 | 0.5 | 0.3 | — |
| Blocked TEDA*[1] | — | — | 0.3 | — |
| Dabuco 33LV*[2] | — | — | — | 2.0 |
| [Blowing Agent] | | | | |
| Water | 0.6 | 0.9 | 0.6 | — |
| Freon-11 | — | — | — | 15 |
| [NCO/OH] | 1.00 | 1.03 | 1.03 | 1.05 |
| [Skin layer] | | | | |
| Thickness (mm) | 1.2 | 1.0 | 1.0 | 1.0 |
| Tensile strength (kgf/cm$^2$) | 33 | 34 | 31 | 26 |
| Elongation at break (%) | 105 | 125 | 111 | 122 |
| Hardness (Shore A) | 69 | 67 | 65 | 65 |
| [Foam layer] | | | | |
| Density (g/cm$^3$) | 0.56 | 0.44 | 0.40 | 0.38 |
| [Molded article] | | | | |
| Impact | 32 | 36 | 42 | 34 |

TABLE 1-continued

|  | Example 1 | Example 2 | Example 3 | Comparative Example (Prior Art) |
|---|---|---|---|---|
| resilience (%) |  |  |  |  |

*1: Obtained by blocking one amine nitrogen of TEDT with formic acid
*2: Trade name for TEDA of Air Products Co.

While the invention has been described in detail and with reference to specific embodiments thereof, it will be apparent to one skilled in the art that various changes and modifications can be made therein without departing from the scope thereof.

What is claimed is:

1. An integral skin-foam molded article obtained by reaction-injection molding a polyurethane foam material comprising a polyether polyol component, an polyisocyanate component having a NCO content of 20 to 35%, a catalyst, and a blowing agent, wherein said catalyst comprises a tin salt of an organic acid present in an amount of from 0.1 to 1.5 parts by weight per 100 parts by weight of the polyol component; and said blowing agent consisting essentially of water present in an amount of from 0.1 to 1.5 parts by weight per 100 parts by weight of the polyol components wherein said catalyst further comprises an amine catalyst having at least one blocked amine nitrogen, said amine catalyst is contained in an amount from 0.1 to 1.5 parts by weight per 100 parts by weight of the polyol component.

2. The article according to claim 1, wherein the polyol component further comprises a mixture of polyether polyols and chain extenders.

3. The article according to claim 2, wherein said polyether polyols have a hydroxyl number, 20-55; average functionality, 2-3; PPG/PEG=70/30 to 95/5; and percentage of primary hydroxyl groups in terminal hydroxyl groups, 50-95%.

4. The article according to claim 1, wherein the isocyanate component is an MDI polyisocyanate.

5. The article according to claim 4 wherein the MDI polyisocyanate further comprises a blend of a prepolymer of pure MDI and a polymeric MDI.

* * * * *